(12) United States Patent
Boothroyd et al.

(10) Patent No.: US 11,127,036 B2
(45) Date of Patent: Sep. 21, 2021

(54) METHOD AND SYSTEM FOR CONDUCTING ECOMMERCE TRANSACTIONS IN MESSAGING VIA SEARCH, DISCUSSION AND AGENT PREDICTION

(71) Applicant: Nextwave Software Inc., Vancouver (CA)

(72) Inventors: Christopher Craig Boothroyd, Vancouver (CA); Corey Auger, North Vancouver (CA)

(73) Assignee: Conversant Teamware Inc., Vancouver (CA)

( * ) Notice: Subject to any disclaimer, the term of this patent is extended or adjusted under 35 U.S.C. 154(b) by 118 days.

(21) Appl. No.: 15/311,028

(22) PCT Filed: May 15, 2015

(86) PCT No.: PCT/CA2015/050444
§ 371 (c)(1),
(2) Date: Nov. 14, 2016

(87) PCT Pub. No.: WO2015/172253
PCT Pub. Date: Nov. 19, 2015

(65) Prior Publication Data
US 2017/0148055 A1 May 25, 2017

Related U.S. Application Data

(60) Provisional application No. 61/994,625, filed on May 16, 2014.

(51) Int. Cl.
*G06Q 30/02* (2012.01)
*G06F 16/9535* (2019.01)
(Continued)

(52) U.S. Cl.
CPC ..... *G06Q 30/0254* (2013.01); *G06F 16/9535* (2019.01); *G06Q 30/02* (2013.01);
(Continued)

(58) Field of Classification Search
CPC .... G06Q 30/0254; G06Q 30/02; G06Q 50/01; G06Q 30/0207–0277; G06F 16/9535; H04L 51/046; H04W 4/14
See application file for complete search history.

(56) References Cited

U.S. PATENT DOCUMENTS 6,029,141 A   2/2000   Bezos et al.
6,557,027 B1  4/2003   Cragun
(Continued)

FOREIGN PATENT DOCUMENTS

EP   1998518 B1   5/2009

OTHER PUBLICATIONS

Social Relevance of Topological Communities in Ad hoc Communication Networks; Herbiet et al., 2011 International Conference on Computational Aspects of Social Networks (CASoN).*
(Continued)

*Primary Examiner* — David J Stoltenberg
(74) *Attorney, Agent, or Firm* — Oyen Wiggs Green & Mutala LLP

(57) ABSTRACT

A computer-implemented method of using the Internet to promote goods and services and connect merchants with potential purchasers in chat groups who wish to obtain suitable sources of goods and services is provided, wherein a plurality of users each have a computer device provided with chat application software and software for accessing and interactively communicating via a computer network with a server provided with a search engine for searching the Internet. Users initiate a chat conversation among a group of users. One of the users invokes a search application using
(Continued)

the search engine. The user conducts a search of the Internet for products or services, reviews the results of the search, selects a product or service located by the search, and shares the selected search result with the chat conversation. One of the users can order the selected product or service as part of the process.

9 Claims, 18 Drawing Sheets

(51) Int. Cl.
    *G06Q 50/00*     (2012.01)
    *H04L 12/58*     (2006.01)
    *H04W 4/14*     (2009.01)

(52) U.S. Cl.
    CPC .......... *G06Q 50/01* (2013.01); *H04L 51/046* (2013.01); *H04W 4/14* (2013.01)

(56) References Cited

U.S. PATENT DOCUMENTS

| | | | |
|---|---|---|---|
| 7,039,677 B2 | 5/2006 | Fitzpatrick et al. | |
| 7,328,242 B1 | 2/2008 | McCarthy et al. | |
| 7,475,110 B2 | 1/2009 | Kirkland et al. | |
| 7,885,641 B2 | 2/2011 | Tysowski | |
| 8,572,099 B2 | 10/2013 | Baluja et al. | |
| 8,693,643 B2 | 4/2014 | Mikan et al. | |
| 9,117,227 B1 | 8/2015 | Agrawal et al. | |
| 9,286,397 B1* | 3/2016 | Suleman | G06Q 30/0269 |
| 9,489,458 B1* | 11/2016 | Haugen | G06F 16/951 |
| 2003/0212746 A1 | 11/2003 | Fitzpatrick et al. | |
| 2005/0149621 A1 | 7/2005 | Kirkland et al. | |
| 2005/0262199 A1 | 11/2005 | Chen et al. | |
| 2006/0059235 A1 | 3/2006 | Peterson et al. | |
| 2006/0143081 A1* | 6/2006 | Argaiz | G06Q 30/0255 |
| | | | 705/14.53 |
| 2006/0195521 A1 | 8/2006 | New et al. | |
| 2007/0239694 A1* | 10/2007 | Singh | G06F 16/9024 |
| 2008/0208812 A1* | 8/2008 | Quoc | G06Q 10/10 |
| 2009/0106040 A1 | 4/2009 | Jones | |
| 2009/0125499 A1* | 5/2009 | Cross | G06F 17/30197 |
| 2009/0164449 A1* | 6/2009 | Huang | G06F 16/951 |
| 2009/0198553 A1* | 8/2009 | Selinger | G06Q 30/02 |
| | | | 705/14.52 |
| 2009/0245500 A1 | 10/2009 | Wampler | |
| 2009/0313334 A1 | 12/2009 | Seacat et al. | |
| 2010/0082427 A1* | 4/2010 | Burgener | G06Q 30/02 |
| | | | 705/14.49 |
| 2010/0205541 A1* | 8/2010 | Rapaport | G06Q 10/10 |
| | | | 715/753 |
| 2011/0137884 A1 | 6/2011 | Anantharajan et al. | |
| 2011/0163971 A1 | 7/2011 | Wagner et al. | |
| 2011/0289011 A1* | 11/2011 | Hull | G06Q 10/107 |
| | | | 705/319 |
| 2012/0001919 A1* | 1/2012 | Lumer | H04L 67/22 |
| | | | 345/440 |
| 2012/0143843 A1* | 6/2012 | Smyth | G06F 17/30867 |
| | | | 707/707 |
| 2012/0158499 A1* | 6/2012 | Banadaki | G06Q 30/0254 |
| | | | 705/14.52 |
| 2012/0158633 A1 | 6/2012 | Eder | |
| 2012/0203640 A1* | 8/2012 | Karmarkar | G06F 1/1694 |
| | | | 705/14.66 |
| 2012/0203846 A1* | 8/2012 | Hull | G06Q 10/107 |
| | | | 709/206 |
| 2013/0103503 A1* | 4/2013 | Zhang | G06Q 30/0269 |
| | | | 705/14.66 |
| 2013/0145303 A1 | 6/2013 | Prakash et al. | |
| 2013/0215116 A1* | 8/2013 | Siddique | G06Q 30/0643 |
| | | | 345/420 |
| 2013/0254199 A1 | 9/2013 | Surendran et al. | |
| 2014/0019545 A1* | 1/2014 | Kosugi | G06Q 50/01 |
| | | | 709/204 |
| 2014/0067544 A1* | 3/2014 | Klish | G06Q 30/0207 |
| | | | 705/14.66 |
| 2014/0074951 A1 | 3/2014 | Misir et al. | |
| 2014/0101557 A1* | 4/2014 | Kelly | G06F 16/9038 |
| | | | 715/734 |
| 2014/0136990 A1 | 5/2014 | Gonnen et al. | |
| 2014/0215578 A1* | 7/2014 | Lessin | G06Q 50/01 |
| | | | 726/4 |
| 2014/0230030 A1* | 8/2014 | Abhyanker | G06F 16/9537 |
| | | | 726/6 |
| 2014/0236953 A1* | 8/2014 | Rapaport | G06Q 10/10 |
| | | | 707/740 |
| 2014/0245191 A1* | 8/2014 | Serena | G06F 21/10 |
| | | | 715/753 |
| 2014/0324982 A1 | 10/2014 | Agrawal et al. | |
| 2014/0337306 A1* | 11/2014 | Gramatica | G06F 16/2471 |
| | | | 707/706 |
| 2014/0344718 A1* | 11/2014 | Rapaport | H04L 51/32 |
| | | | 715/753 |
| 2015/0066479 A1 | 3/2015 | Pasupalak et al. | |
| 2015/0127628 A1* | 5/2015 | Rathod | G06F 16/955 |
| | | | 707/710 |
| 2015/0178388 A1* | 6/2015 | Winnemoeller | G06F 17/30864 |
| | | | 707/722 |
| 2015/0200815 A1* | 7/2015 | Verkasalo | G06F 16/9535 |
| | | | 707/740 |
| 2015/0213507 A1* | 7/2015 | Zhou | G06Q 50/01 |
| | | | 705/14.66 |
| 2015/0235289 A1* | 8/2015 | Jeremias | G06Q 30/0613 |
| | | | 705/26.41 |
| 2015/0295873 A1 | 10/2015 | Orr | |
| 2015/0302103 A1* | 10/2015 | Jeremias | G06F 17/30867 |
| | | | 715/758 |
| 2015/0332334 A1* | 11/2015 | Bitran | G06Q 30/0207 |
| | | | 705/14.58 |

OTHER PUBLICATIONS

Community Detection in Online Social Networks Using Actions of Users; Moosavi et al., 978-1-4799-3351-8/14/$31.00 © 2014 IEEE.*
People and Entity Retrieval in Implicit Social Networks; Pathapati et al., 978-1-4577-1328-6/11/$26.00 2011 IEEE.*
Social Network Analysis in Enterprise; Yung Lin et al., vol. 100, 0018-9219/$31.00 2012 IEEE No. 9, Sep. 2012 | Proceedings of the IEEE.*
PCT International Search Report dated Jul. 24, 2015 for PCT Appl. No. PCT/CA2015/050444.
PCT International Search Report dated Jan. 19, 2017 for PCT Appl. No. PCT/CA2016/051427.
Published article from Avaya Inc. Enhancing Customer Support Through Avaya Automated Chat, 2013.
Extended European Search Report dated Oct. 9, 2017 for European Appl. No. 15792073.7-1871 / 3143576 PCT/CA2015050444.
"Conceptual Graphs As A Universal Knowledge Representation", John F. Sowa, Computers & Mathematics With Applications, vol. 23, No. 2-5, Jan. 1, 1992, pp. 75-93.
Supplementary European Search Report issued on EP Appl. No. 16869455, completed May 13, 2019.
Fechner, Thore et al., "Ethermap—Real-time Collaborative Map Editing", Interactive & Multi-Surface Maps, CHI 2015, Crossings, Seoul, Korea; Human Factors in Computing Systems, ACM, 2 Penn Plaza, Suite 701 New York, NY, USA (Apr. 18, 2015).

* cited by examiner

Building the User Graph: User-Agent Relationship & User Knowledge Density Curve Phases Diagram: User State Graph 'Slice' with Subgraph Display

METHOD AND SYSTEM FOR CONDUCTING ECOMMERCE TRANSACTIONS IN MESSAGING VIA SEARCH, DISCUSSION AND AGENT PREDICTION

CROSS REFERENCE TO RELATED APPLICATION

The present application claims the benefits, under 35 U.S.C.§ 119(e), of U.S. Provisional Application Ser. No. 61/994,625 filed May 16, 2014 entitled "Method and System for Generating Business Referrals from Chat Discussion Groups" which is incorporated herein by this reference.

TECHNICAL FIELD

The invention relates to methods of using the Internet to promote goods and services and connect merchants with potential purchasers. More particularly the invention relates to methods of using software agents to assist chat groups in obtaining suitable sources of goods and services.

BACKGROUND

Various methods have been developed for directing online shoppers to merchant web sites of interest and rewarding the referring party for the referral. For example U.S. Pat. No. 6,029,141 to Amazon.com, Inc. discloses a method of Internet-based referral wherein associates market products of a merchant on their websites which customers may then purchase through a referral link on the associate website which takes the customer to the merchant website. If the customer purchases the product then the associate is paid a referral fee.

Similarly searches on map sites such as Google maps will provide recommendations to the searching party as to a restaurant, hotel etc. in the vicinity of the location searched. A large proportion of communications by smartphone now consist of smartphone instant messaging or SMS messaging. To date however businesses have not taken advantage of group discussions such as chat messaging groups where such groups are searching for products or services on a group basis, nor have they taken advantage of contextual information which can affect the current inclination of such groups to purchase goods or services.

Google has created an online knowledge base called Knowledge Graph which uses semantically organized information to enhance its search results. Interest graphs are also used as online representations of a particular individual's specific interests.

A "software agent" is a computer program that acts independently to perform tasks for its principal, whether a person or another computer program.

Software agents have been used for many years in such roles as shopping or buyer agents, monitoring and surveillance agents, data mining agents and communication agents. Software agents add to the user's capability to obtain useful information.

Programmatic advertising is a term for the buying of impressions on smartphone apps or websites, known as "programmatic direct". Buying can be triggered automatically through a predefined set of conditions in much the same way that stock trading is done. Since smartphones generate contextual data about their users, it would be desirable to use such contextual awareness and programmatic buying of ads to allow companies to target users on mobile apps and websites for advertising.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An embodiment provides a computer-implemented method of using the Internet to promote goods and services and connect merchants with potential purchasers in chat groups who wish to obtain suitable sources of goods and services, wherein a plurality of users each have a computer device provided with chat application software and software for accessing and interactively communicating via a computer network with a server provided with a search engine for searching the Internet comprising:

a) said users initiating a chat conversation among a group of users;
b) one of said users invoking a search application for utilizing said search engine;
c) said one of said users conducting a search of the Internet for products or services;
d) said one of said users reviewing the results of said search of the Internet for products or services and selecting a product or service located by said search;
e) said one of said users injecting said selected search result into said chat conversation;
f) said one of said users or others of said users ordering said selected product or service.

A further embodiment provides a consumer-oriented software agent accessed from any mobile device, tablet, smart device, laptop or desktop computer. The agent curates an understanding of each user's past, current and possible future states and needs in the form of a user graph which creates and tracks the constantly evolving and changing User state. To do this a novel form of notation can be used for communication between User and Agent, such as a Simple Knowledge Graph Notation. Once the Agent has built a User Graph, the agent can assist the user in locating useful information and predicting the user's future states and needs. The agent then can also assist chat groups in obtaining suitable sources of goods and services by combining the user graphs of the users in a chat group into a group graph.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

For purposes of this application the following definitions apply:

A "User Graph" is a real time dynamic graph formed from contextual data relating to a specific user which is built from data collected from User chats, searches, existing interest graphs such as the User's Facebook interest graph, smartphone apps, web browsing and other available User behavioral data in which the nodes consist of objects, people, places, things, concepts etc. and an edge defines a relation between the vertices connected by the edge. It can be visually represented as a graph consisting of nodes and edges. It can consist of a number of subgraphs.

A "User State Graph" is the state of a User Graph at a given point in time.

A "Group Graph" is a real time dynamic graph formed from the User Graphs relating to a number of specific users who form a chat group.

A "Group State Graph" is the state of a Group Graph at a given point in time.

"Agent" is a software agent which maintains the User and Group Graphs.

Figure 1A:
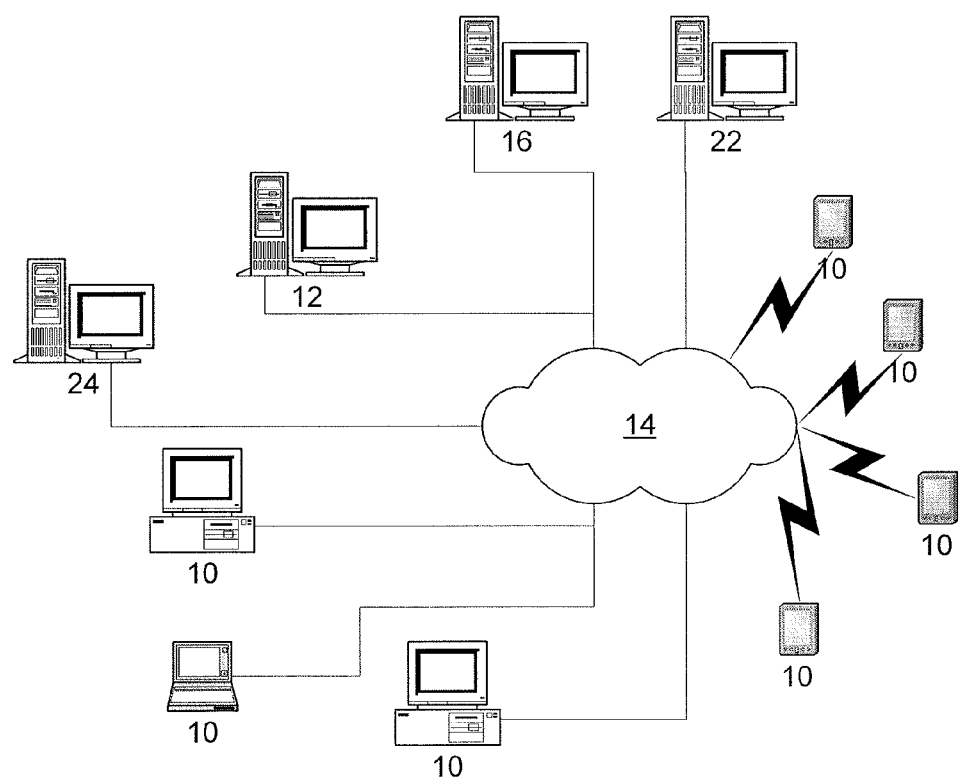
FIG. 1a is a schematic diagram illustrating the network or system used to carry out the invention.

With reference to FIG. 1a, the method of the invention is carried out by users 10 via a plurality of user computer terminals, whether desktop, tablet, laptop, smart phone, other mobile device or the like, and provided with application software to access Agent server 22 via Agent web server 12 via the Internet 14 and a social network hosting server 24. A vendor advertising agent server 16 also accesses Agent web server 12 via the Internet 14.

Figure 1B:
FIG. 1b-g are screen shots of a mobile application for carrying out a first embodiment of the invention.
Figure 1C:
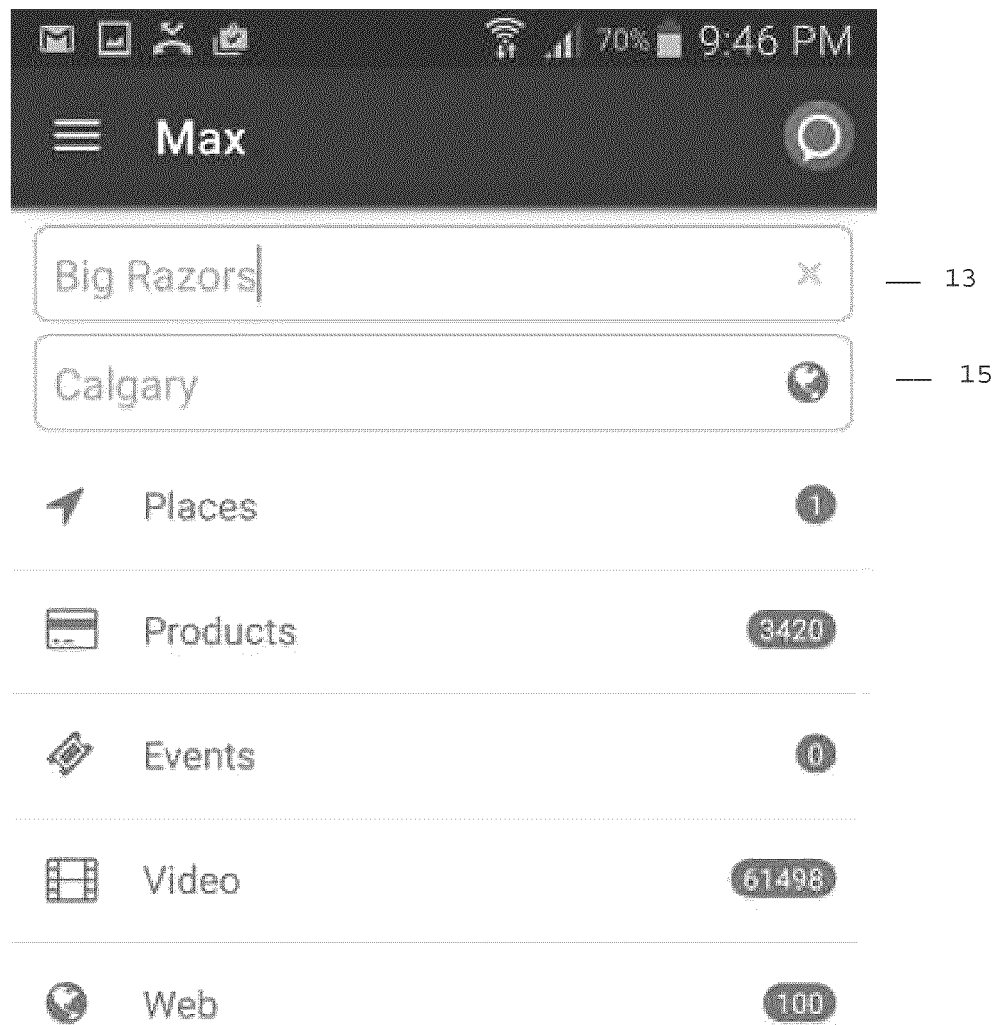
Figure 1D:
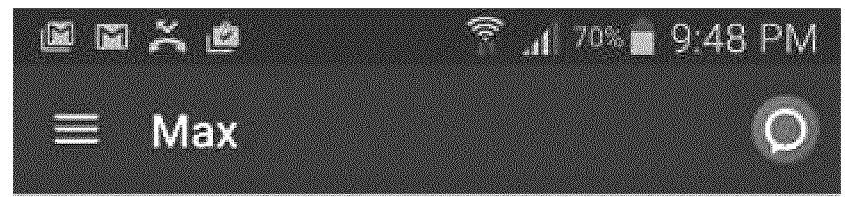
Figure 1D:
Figure 1D:
Figure 1D:
Figure 1E:
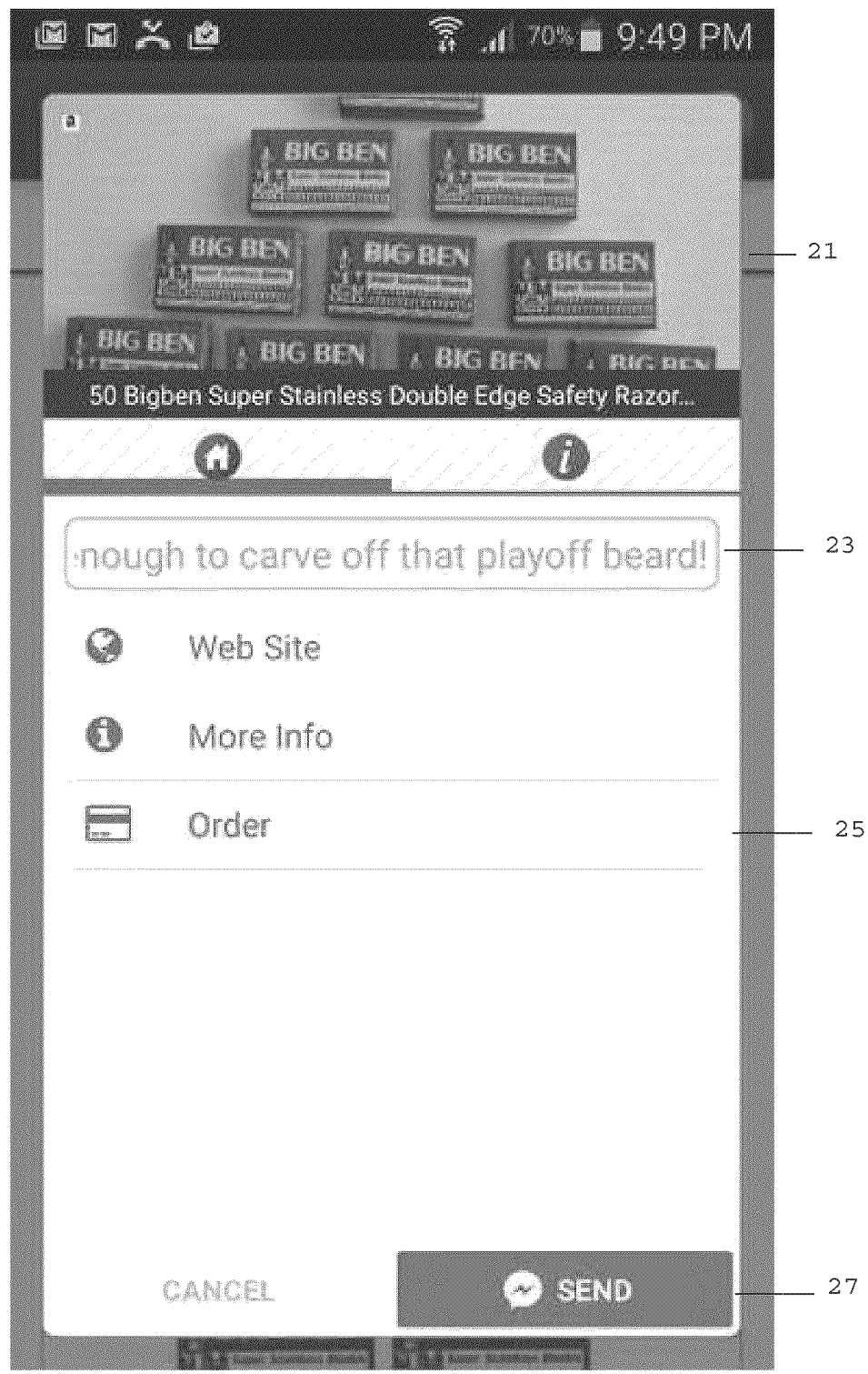
Figure 1F:
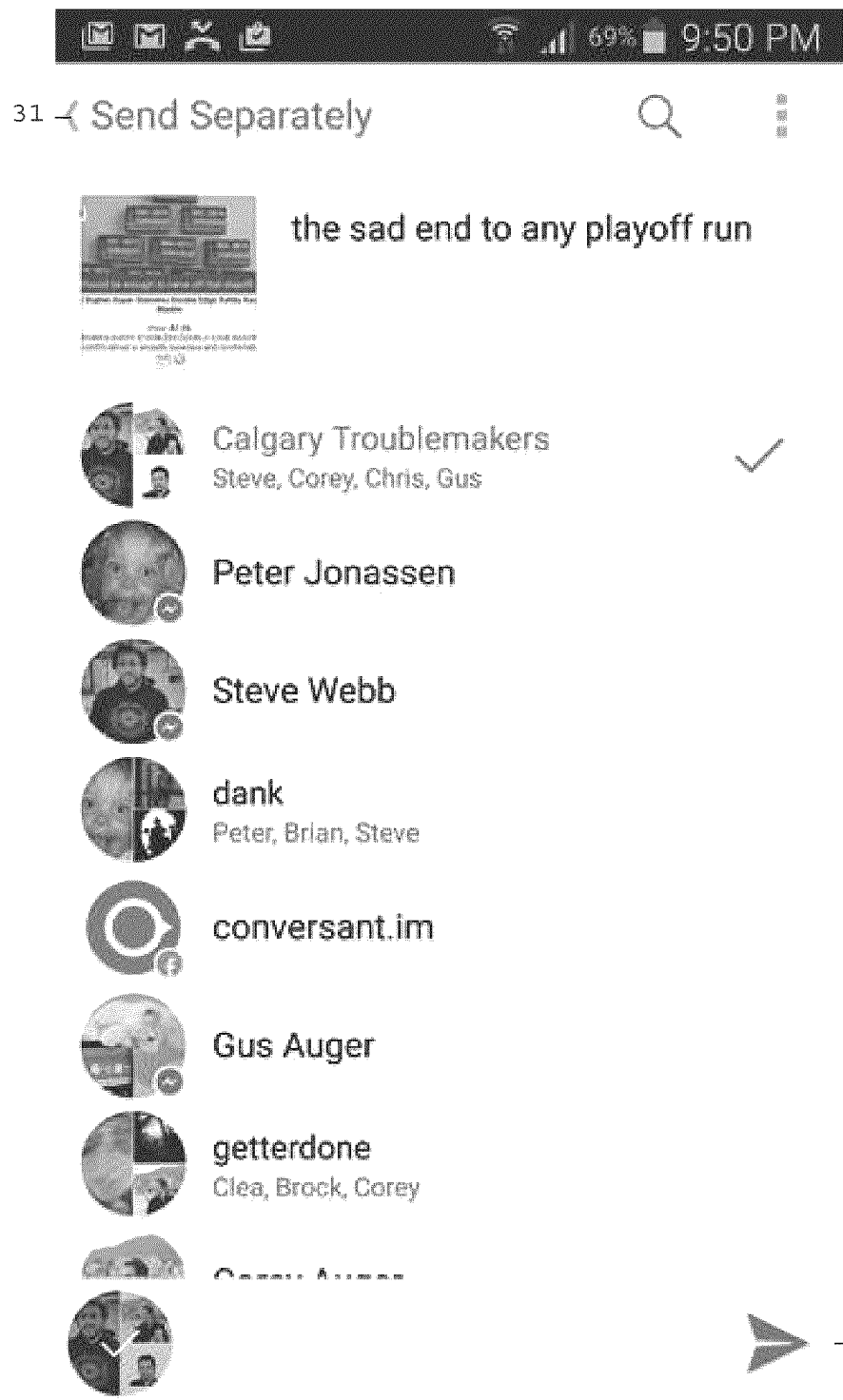

In a first basic embodiment of the invention illustrated in FIG. 1b-1g, a group of users 10 participate in a chat conversation over smartphones 10 provided with a chat application such as Facebook Messenger, and a search agent application according to the invention. FIG. 1b illustrates a screen shot from the smartphone of a participant in a chat session among the group "Calgary Troublemakers" on Facebook Messenger. The control panel at the bottom of the screen includes an extra icon, shown as a magnifying glass 11, which is a search button. During the chat conversation, a user 10 may touch the search button 11 to send a request to the operating system, which invokes the search agent ("Max") screen shown in FIG. 1c. The user can then enter search terms in box 13. The device's GPS may automatically enter a geographic limiter for the search in box 15, or the user can enter a different geographic location. A search engine (e.g. Google or the system's own search engine) then carries out a web search based on the key words and returns the search results as shown in FIG. 1c, preferably filtered into different categories, one of the examples in this case being "Products". FIG. 1d illustrates a screen shot when the user selects the "Product" category to review the search hits. Each search hit is displayed as a card or tile 17. The source of the search hit is shown by the logo at 19. By tapping the card 17 on the smartphone screen, the screen shown in FIG. 1e is invoked. At the screen shown in FIG. 1e, the user can compose a message to insert the selected search result into the chat group, or directly order the product. A comment about the selected product can be entered in box 21. Selecting the order button at 25 takes the user to the source of the search hit to order the product.

Figure 1G:
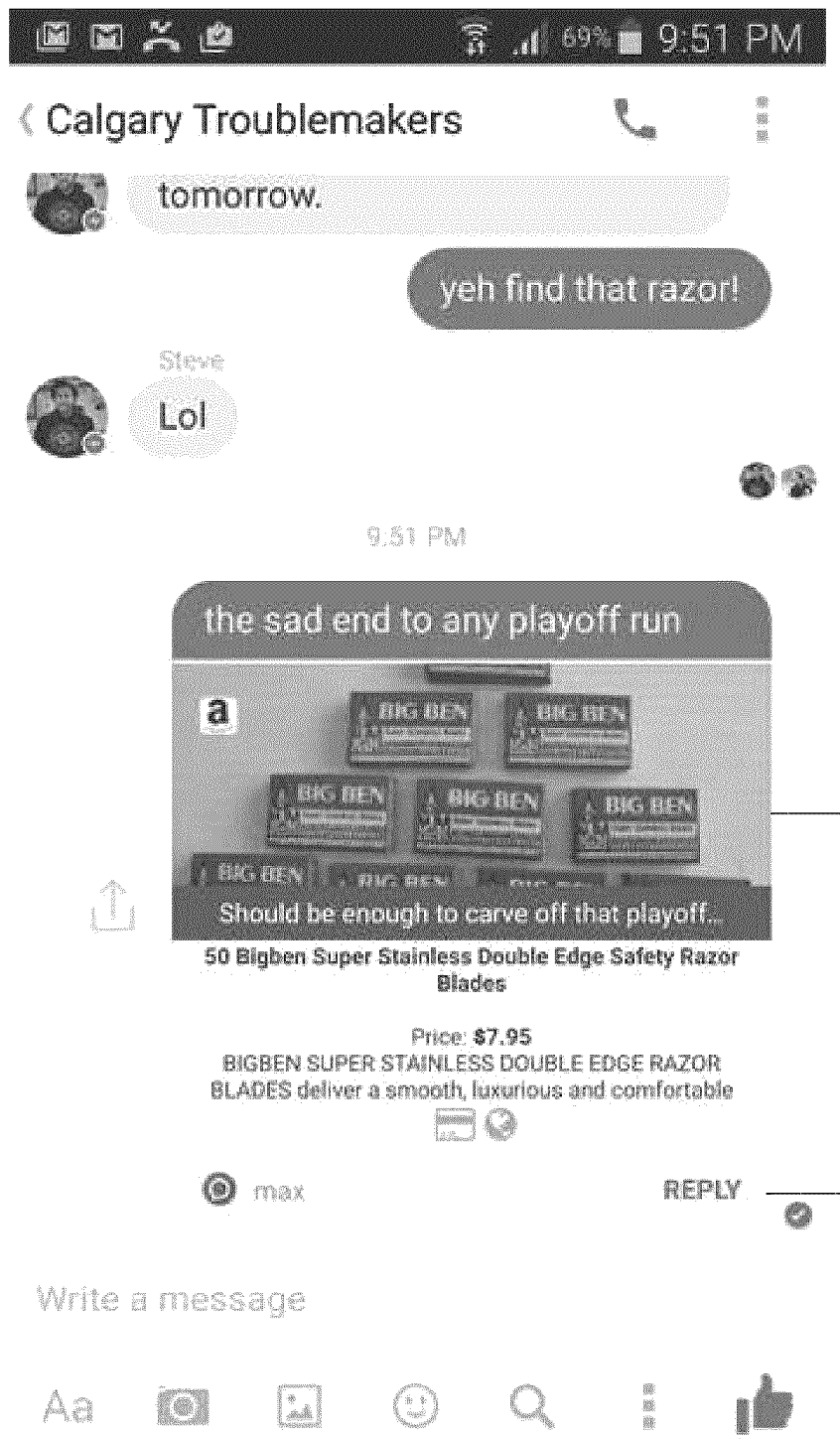

Still with reference to FIG. 1e, by selecting the "Send" button 27 the user can inject the selected product card into the chat group or send it to other recipients. Tapping the "Send" button 27 takes the user to the screen shown in FIG. 1f where the user can select the recipients to be sent the product card. Tapping the arrow at 29 will inject the product card and comment as shown in FIG. 1e back into the chat conversation in FIG. 1b from which the search function was invoked, or the user can elect to send the card as a separate message to each selected recipient by tapping the "Send Separately" button 31. FIG. 1g illustrates the product card having been injected into the chat group. Any user can then re-distribute the card or order the product displayed by tapping the card 33, which takes the user to the screen shown in FIG. 1e, from which the user can order the product or re-send the card. The display on each user's screen includes a "Reply" button 35 which when tapped will take the user to the "Max" search screen shown in FIG. 1c to review the other search results or conduct a new search.

While the foregoing method illustrates the search for a product, the same method also functions for searching for services, such as a restaurant. In the case of a restaurant service, selecting the "Order" button 25 once a search result card has been selected will take the user to a reservation page for the selected restaurant (such as "Open Table").

Thus the method allows the participant in a chat group to use a search agent "Max" to locate a product or service, during the course of a conversation, and display a selected product or service to the group for ordering. Thus a process of chatting, searching for a product/service, selecting the product/service from the search results and sharing the selected product/service into the chat group is provided. Until the Agent has a complete enough User Graph to automatically return requested content directly into the chat itself, this more manual system of search, select and share must be used to help build the User Graph and train the Agent. The system is monetized by obtaining a payment from the source of the product or service when the product/service is ordered and paid for from the vendor of the product/service. In carrying out the foregoing activity, the User's searches, selections and sharing actions further build out the User Graph, as described in detail below, every time a search is performed.

User Interest Graph Structure, Building & Maintaining

In a more sophisticated embodiment, a number of the Users 10 on smart phones 10 provided with the necessary app register with Agent 22 over web site 12 and provide certain common basic information about the User such as age, sex, marital status, residential address, education etc. The User enters an agreement with the Agent to address privacy and other issues to permit the Agent to collect information from the User concerning the User's location, searches and communications.

The Agent generates the User Graph for the registered user, starting with the basic information provided on registration and collected over time by the Agent which processes such information to curate, learn, query and predict things of use and interest to the User. Each User Graph itself may comprise many subgraphs: event, search, social, interest, behavioral, biological, location, etc. Each of these subgraphs may have its own specific set of applied properties and ontologies. The User Graph can be built and curated by the Agent through automated collection of in-context data and by direct entry from the User themselves to directly curate parts of their own User Graph or Subgraphs. An example of automated collection is the User's Interest Graph where in Facebook the User can like something. Another example would be to use the in-chat search app described above to map the User's search, selection and sharing choices. The Agent collects and processes the information to create and track the state of each of these subgraphs and may employ sub-agents or external services to format and update these subgraphs. This approach of subgraphing the User Graph provides flexibility in curating current in-use subgraph data collections with the ability to add new subgraph types defined by new ontologies or processes without disruption to existing in-use subgraphs. For example, a User "Search Subgraph" that contains the User's solo or in-chat searchs, selections and what they then shared, as described above, can be created and updated by the Agent.

Preferably the User's relationship with the Agent starts before a chat with others even begins, using features like search or a feed app described below and others where the User and the Agent are working together initially to build out the fully curated User Graph. The Agent interacts and learns from the User and fills out subgraphs to the point of curation. A trust relationship is developed between the User and the Agent. Helping the user work with the Agent to build out the other User Graph subgraphs like the Event subgraph (planning/calendar), plugging in wearables data (heart rate, blood pressure, blood chemistry etc) into the Biological subgraph, etc.

Figure 2:
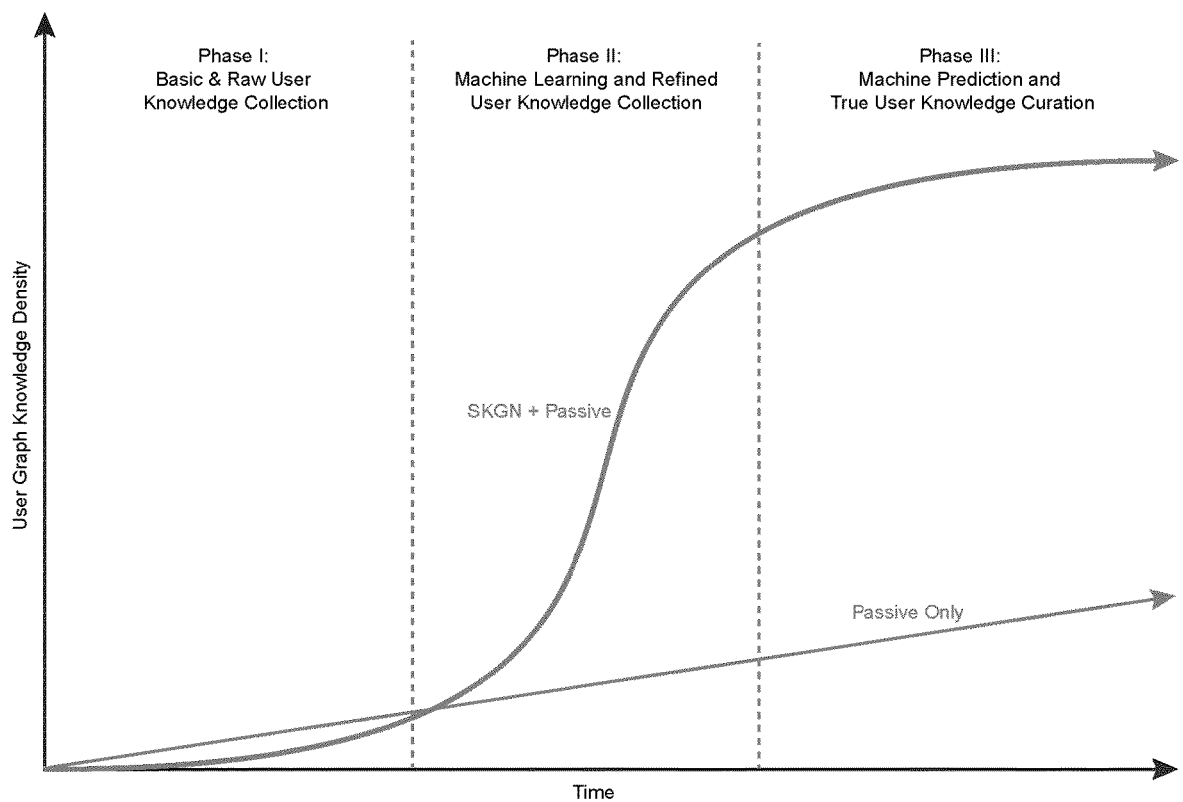
FIG. 2 is a schematic diagram illustrating the knowledge density in a user graph as a function of time.

By using a particular notation, described herein as Simple Knowledge Graph Notation (SKGN) to communicate data to the Agent, the User can help build higher density knowledge faster with less required computational resources. From the outset, the User may 'chat' with the Agent and tell them things and/or the Agent presents them with various User Interfaces (i.e. interest graph "Like", "dislike", "Loves", "hates", "Scary", "Agrees" etc). This helps accelerate the building of the User Graph which in turn allows the Agent to do things and find things of high value to the User. Initially the Agent may start as a slightly more useful search function for the User (than other search engines), much like current search engines but as the User and Agent interact by the filling out or collection of information to fill out the User Graph, there will be a curve of convenience and reliance wherein the User begins to interact more intimately with the Agent and there is an exponentially growing level of detail in the User Graph, which then levels off when the bulk of the user subgraphs are filled out and the rate of density increase resembles a true machine prediction and curation curve. This is illustrated in FIG. 2.

Currently other search agents play a passive role, analyzing the User's actions and behavior behind the scenes and present the user with suggestions based on probability-based lower density knowledge sets. By using SKGN the User can direct the Agent to higher density knowledge sets while utilizing less computational power, all producing much more accurate suggestions for the User.

User Graph Knowledge Density and its Value

High density knowledge sets in the User Graph are valuable because they represent richer paths through knowledge space and thus capture more accurate user context, user state and subgraph state information.

As an example, a low density knowledge set would look like: (UserA)—[LIKES]—>(Beer)

A high density knowledge set would look like:
(UserA)—[LIKES]—>(Beer)—[TYPE]—>(Lager)—[BRANDED]—>(BeerWorks Lager)—[PACKAGED]—>(Stubby Bottles)—[STATE]—>(chilled)

It is difficult to build high density knowledge sets using passive methods as is currently done and costs more in processing time and analysis to infer the same level of density, which may still suffer from a probability of failure. If the User formats the foregoing knowledge set using one or more SKNG operator, the Agent can become much more accurate i.e. #beer>lager>chilled or #beerlagerchilled—the Agent will be able to leverage a higher density knowledge set to make more desirable suggestion sets. This leverages the ability for the user to directly supply the agent with personal explicit knowledge to use in the subgraph as contrasted to the agent filling the subgraph with inferred probabilistic knowledge (i.e. bayesian).

Unlike other existing agents there are two coupled learning curves in action: One for the Agent about the User and One for the User about the Agent. The Users themselves collect data/knowledge to build User Graph Knowledge Density (and for the Group State Graph a discussed below) by the User being asked questions and taught how to format Knowledge information and questions for the Agent (for example using SKGN). Existing systems scan through users' data, for example emails and searches. Here active collection is done in parallel with background Natural Language Processing and Inference. Here not only will the Agent receive communications from the User to build the User Graph but also the User will receive communications from the Agent, such as communications in Simple Knowledge Graph Notation (SKGN) suggesting paths of possible interest. The Users learn how to better communicate with the Agent using SKGN. Hence there is a two-way dialogue.

Three Distinct Phases in the User-Agent Relationship Curve a) Phase I: With specific reference to FIG. 2, in Phase I the User and Agent are just getting to know each other. User Graph (and subgraph) knowledge density is low. The Value to the user is similar to a Google search with somewhat more usefulness because of Agent's basic knowledge about the User's gender or raw data like the User's geolocation. Typically in this phase, there is reliance on Natural Language Processing (NLP) and Inference to build the User Graph with probabilistic guesses. As the user selects specific suggestion tiles, those knowledge sets are added to the relevant User subgraph, the subsequent Group State Graph (GSG) and to the Conversation subgraph.

b) Phase II: As the User begins to use more direct methods to actively direct the Agent to specific tasks, the Agent is able to build accurate, high density knowledge in the User Graph. This gives the Agent better data for machine learning and conversely, it is able to ask the User more relevant questions and present more relevant suggestion tiles. This methodology of using SKGN in conjunction with other methods has an advantage over existing approaches and creates an exponentially-sloped curve simply because the User and Agent know how to talk to each other and more efficiently transfer information between them. The SKGN notational efficiency provides operational advantage over existing agent services.

c) Phase III. Like any relationship, the amount of new information and knowledge set sharing will taper off and the emphasis will be on the maintenance and curation of the User Graph of knowledge sets. Once this part of the curve has been reached, the ability for the Agent to predict accurately what the User will want will be greater than existing approaches because the Agent will have access to deeper value high density knowledge sets and the ability to curate them directly via the User. This power will also be passed on to the GSG where the Agent(s) will be able to leverage group usage of SKGN to deliver more accurate suggestion tiles.

User Case: The Feed App

As additional tools for assembling a deeper User Graph, a News Feed

App may be provided by allowing the Agent to chat directly with the user (and other UI components). In this context, there are no others involved with the User and the Agent and the Agent is engaging the three phases with the user to build the User Graph and to find interesting things on the internet to build a continuous feed of items for the user to consume, much like a Smart RSS feed. The User gives the Agent permission to scan and pull information directly from the Facebook and Twitter feeds as well as other sources like RSS news feeds. The User also informs the Agent of topics and contexts of interest to build knowledge sets to help the Agent find and filter links to interesting content.

For example,
(UserA)—[LIKES]—>(Beer)—[TYPE]—>(Lager)—[BRANDED]—>(BeerWorks Lager)—[PACKAGED]—>(Stubby Bottles)—[STATE]—>(chilled)
+
Beerworkslager>events>beergarden
Could produce a contextual Topic filter for the Feed like:
(UserA)—[LIKES]—>(Beer)—[TYPE]—>(Lager)—[BRANDED]—>(BeerWorks Lager)—[EVENT]—>(BeerGarden)—[STATE]—>(chilled)
might lead to a link to relevant events within a geofence where BeerWorks Lager is being served chilled, possibly in stubby bottles.

The user may take a resulting feed item like this and use it to INITIATE a chat with others.

For example, a Feed item has a (start chat) button on it which allows the user to select a few chat participants and initiates a chat with the feed item at the top.

[Feed Item A]—>'beerWorks Beer Garden Event' (link)
[Feed Item A]—>Select Item Chat
[Contacts List]—>Select Group members
[Initiate and Invite to chat]
In Chat;
[link to Beer Garden Event]
[Hey guys! I found a Beer Garden gig this weekend where they are serving our fav BeerWorks Lager!]

In this way the Agent technology is involved from the outset, even being used to seed the beginning of any conversation.

Figure 3:
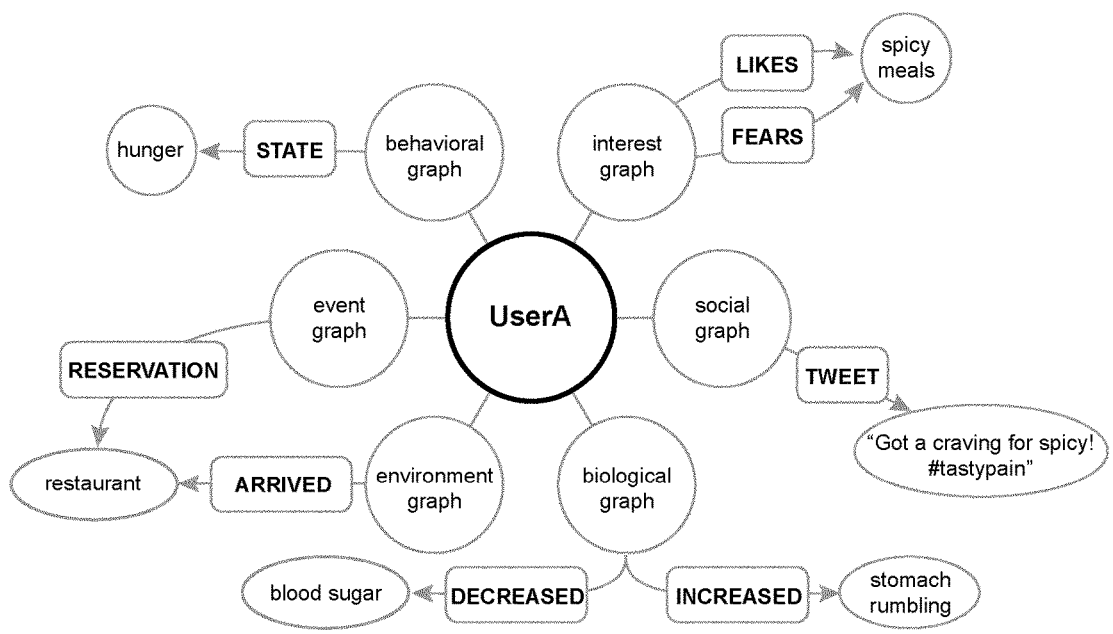
FIG. 3 is a schematic diagram illustrating a User State Graph slice with subgraph display.

To be of practical usage, the User Graph with all subgraphs may be 'quantized' into a number of "User State Graphs" which are a snapshot of the User Graph at a time (t) as illustrated in FIG. 3. For example that answers simple questions like "What did the user like last Wednesday?", "What mood is the user in at the moment?", "What do we think the user will want to eat next Friday at lunch?" The visual representation of the User State Graphs can be thought of as a slice across the time axis revealing the User Graph and its subgraphs as a fixed entity-edge graph diagram.

Leveraging the User Graph

Figure 8:
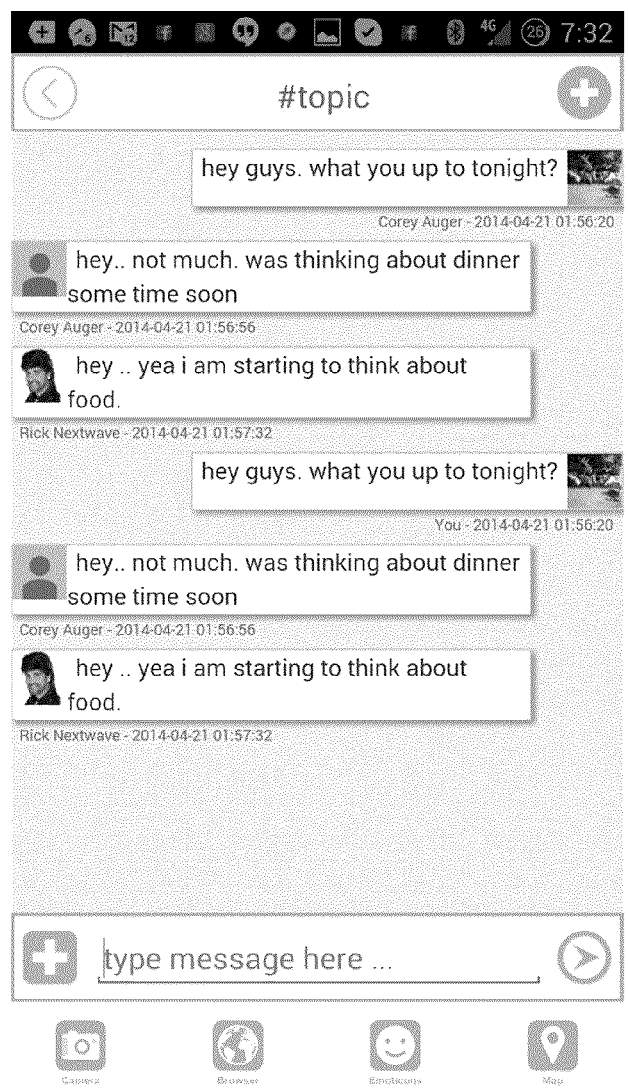
FIG. 8 is a screen shot illustrating a group chat session.

This quantization of state is necessary for the Agent to be able to perform discrete analysis and processing of the User Graph or to hand off an anonymized User State Graph to other Agents for processing, conversation and transaction graph construction. Examples of User State Graphs for Users A, B and C are shown in FIG. 8. User State Graph processing can be done by the Agent, sub-agents, affiliated Agents or arms length Agents or by a number of technologies to analyze it and perform valuable services such as (but not limited to) inferring the User's likelihood of hunger, choosing and suggesting an appropriate meal or finding a meal purchase discount in advance and lining that up with a mobile payment provider.

Figure 4:
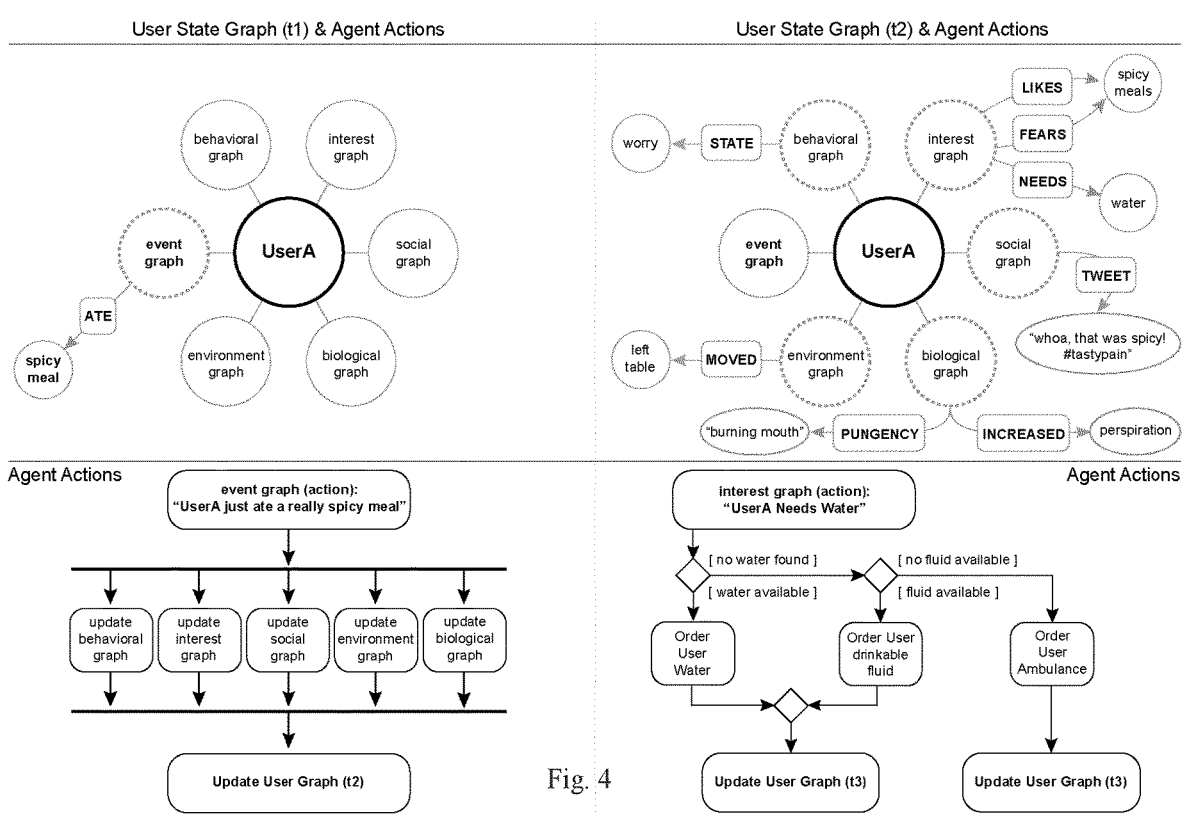
FIG. 4 is a schematic diagram illustrating a User State Graph Processing & Analysis for Inference and Action.

To perform its analysis, the Agent may use, but is not limited to, open ontologies/taxonomies, folksonomies or private thesauri versions. The Agent may use (but is not limited to) SKOS, OWL or OWL2 open source Inference engines or private black box inference engines. The Agent may use (but is not limited to) statistical analysis to determine relevance, deep learning techniques between successive User State Graphs or Natural Language Processing to augment User State Graph processing. FIG. 4 illustrates User A's State Graphs at two times t1 and t2. Between those times User A has eaten a spicy meal. The Agent Actions on the User Graph are shown, The Agent updates the User Graph at t2 based on the changes which occurred after t1. The Agent may then infer that the User needs water or medical assistance and presents suggestions to the User for action. Finally the Agent updates the User Graph at time t3.

Group Chat Assembly

Figure 5:
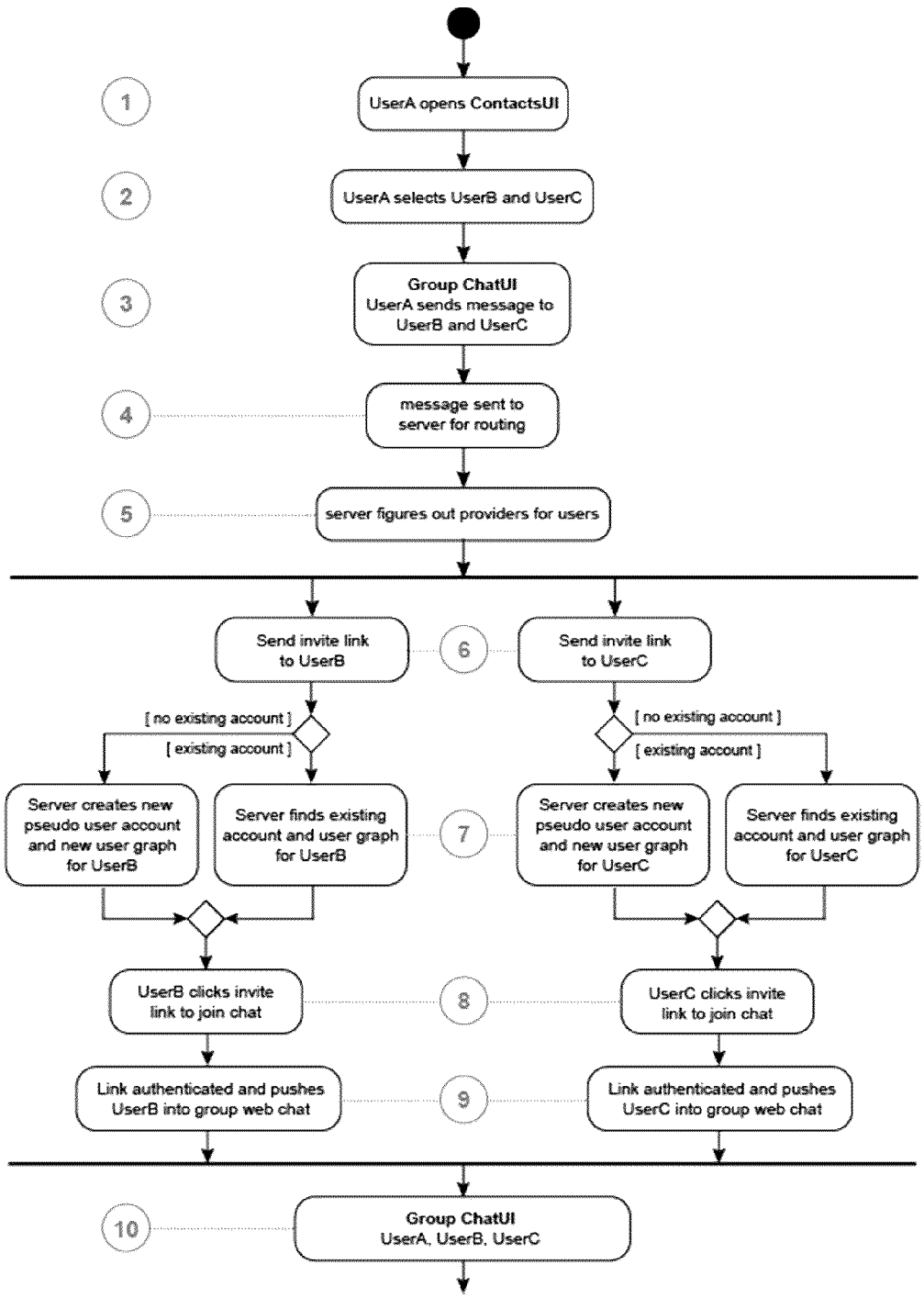
FIG. 5 is a schematic diagram illustrating a Group Chat Assembly.
Figure 6:
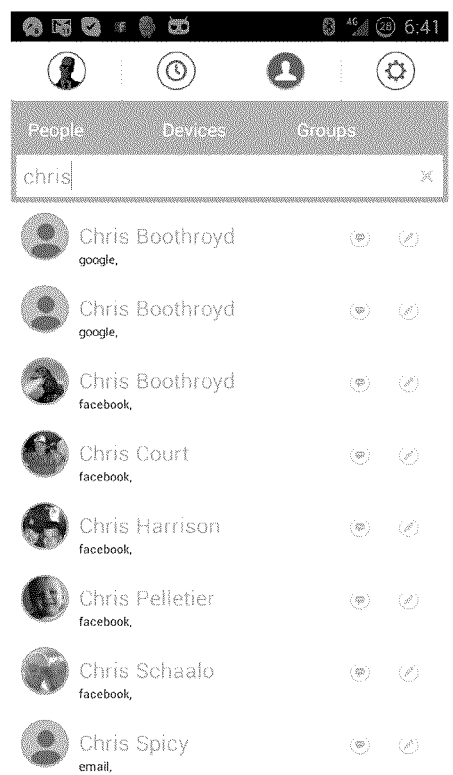
FIG. 6 is a screen shot illustrating a contact list.

With reference to the flow chart in FIG. 5, this illustrates the process for server 22 (or other server) to assemble a group chat among Users, even on different chat platforms. As the first step (1) Contacts: inside the mobile native or web app, User A navigates to his list of contacts, shown in FIG. 6. This list is the aggregation of contacts pulled from the smart phone as well as various social networks. The entire list might therefore contain a number of contacts for the same person.

At step 2 of FIG. 5, Contact Select, User A selects 1 or more contacts from the list that they want to start communications with. These contacts could be from anywhere in the contact list and do not have to be from the same chat provider. At step 3, Invite—User A now posts a message into the newly created chat room. This message is now sent to the server to allow it to deal with routing and user creation. At step 4, Transport—information is sent to the server for processing.

At step 5 Routing—Server 22 uses a routing table to look up which providers User B and C are on. Once the server knows how to handle the message it forwards the message on to be sent out by the message handlers. At step 6, Link—the server looks to construct a unique url that will allow the user A or B a temporary login to the chat. At step 7, User Create—server 22 will find or create a "Pseudo" user account that will be used in the authentication of the link that is given out. The link is then sent using the proper provider to the users.

Those chat group members who are pseudo-users and do not register with the Agent will not have a password to the system and may not have full access to features in the system such as the ability to independently utilize the Agent outside of the chat group. The system assigns an account identifier for each pseudo-user referenced to the pseudo-user's email, Facebook, Twitter, Linked-In, Xbox (or any other current or future provider's) account through which the user was invited into the chat group. One individual therefore may have multiple pseudo-user accounts which eventually may become merged. The Agent will nonetheless build up the pseudo-user's User Graph as described below with whatever data is available as it would for a regular user. Eventually the pseudo-user may register as a regular user, either after participating in additional group chats, or when attempting to use the Agent. Various user interfaces can be provided at various intervals which will encourage the pseudo-user to register and log in.

Figure 7:
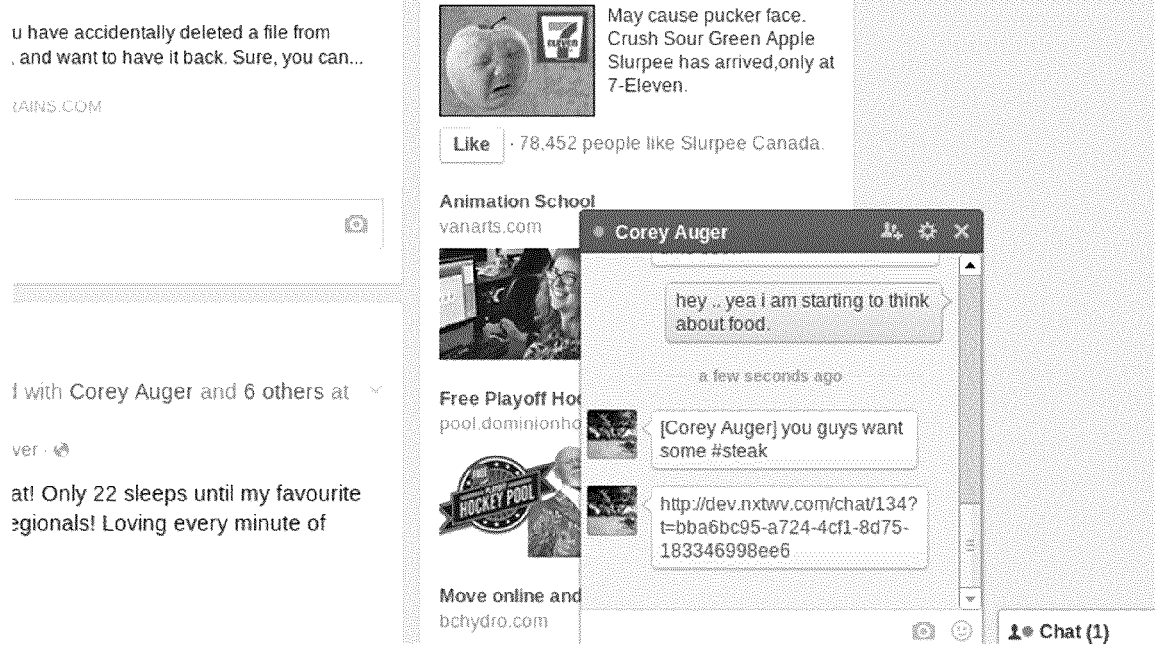
FIG. 7 is a screen shot illustrating a group chat session.

In step 8, Acquisition—Users B and C click the link that was delivered in the chat as illustrated in FIG. 7, The link will launch the browser on that device and begin loading the web chat. In step 9 Authentication—the system uses the link to authenticate the "pseudo" user and move them into the web chat. Step 10 Unified Chat—Users are now in a unified chat view as illustrated in FIG. 8 and are able to participate in the group chat and launch applications.

Figure 9A:
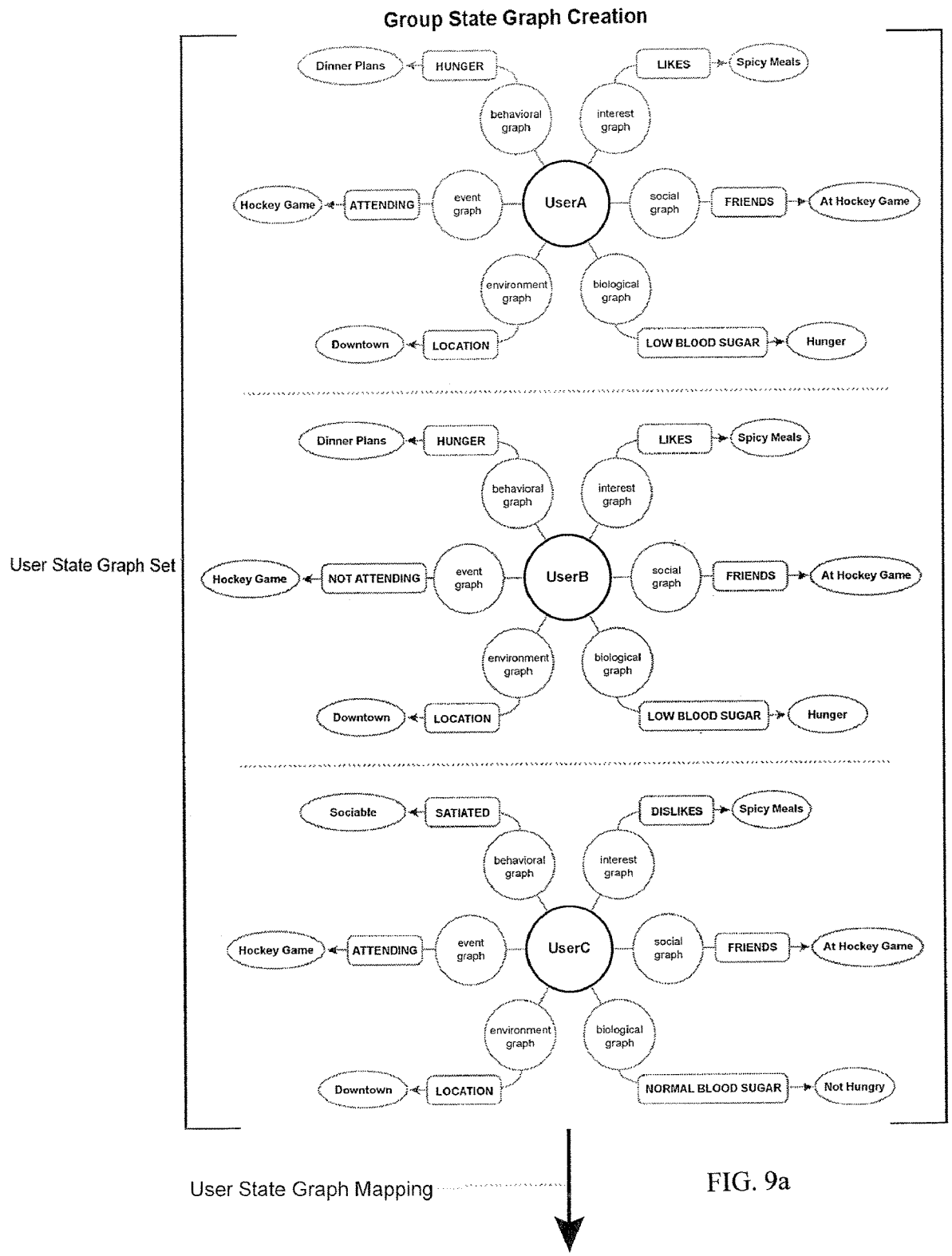
FIGS. 9a and 9b are a schematic diagram illustrating Creation of a Group State Graph from User Graphs.
Figure 9B:
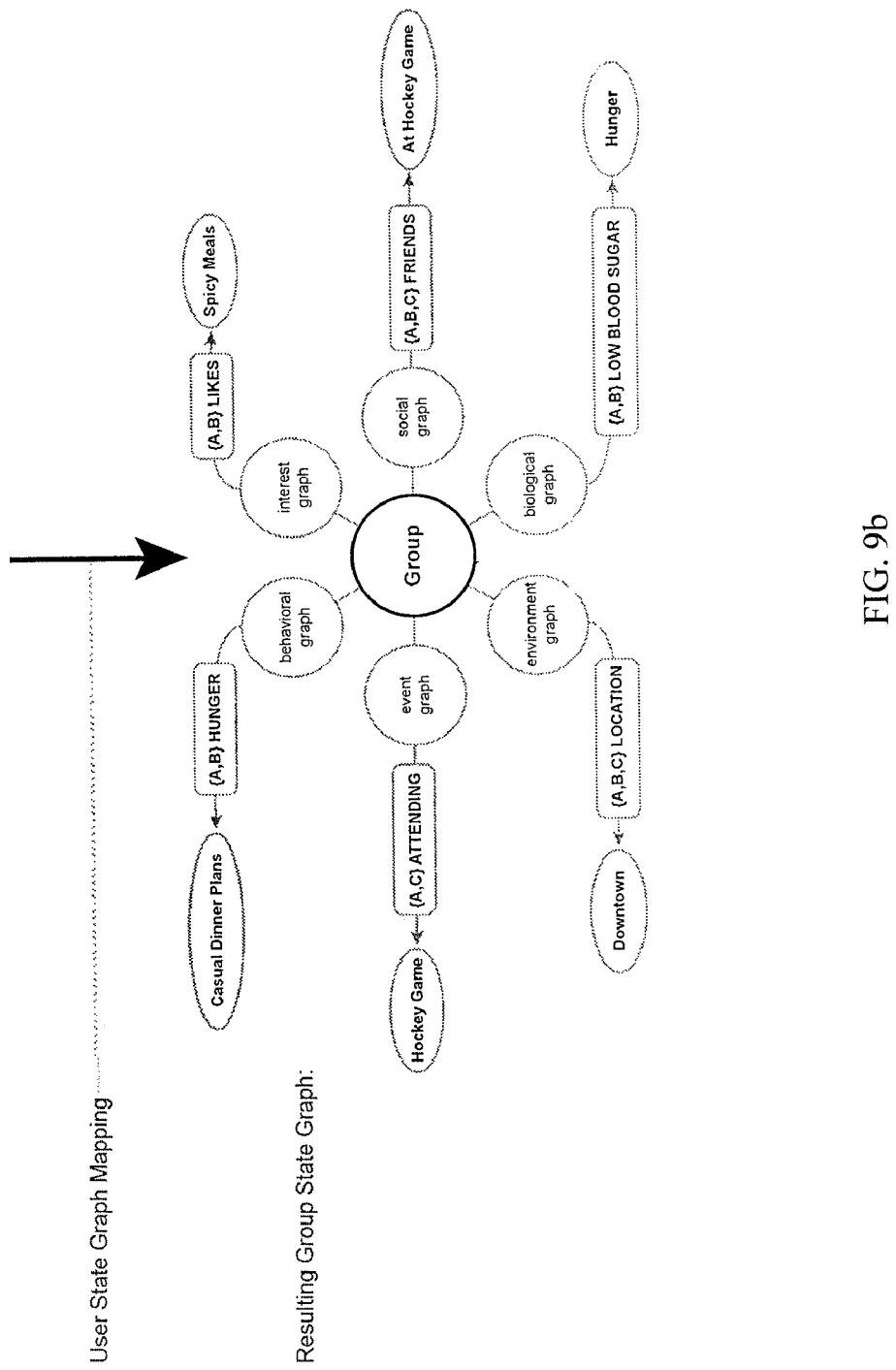

With reference to FIG. 9, User State Mapping, the Agent 22 now combines the group chat members' User State Graphs into a Group Graph. This can be done by complete union, or statistical relevance (e.g. "We all like/love/crazy about Elvis"). This can also be done by simply working out the intersecting commonalities in all the User Graphs and maintaining those in the Group Graph as Group Common Interests (e.g. Everyone likes Lager and Spicy Food, Everyone dislikes Marching Band Music). In step 2 of FIG. 10, the Group State Graph (GSG) is derived from User State Graphs. This is used to process Group Chat activity and track it.

The process for generating a Group State Graph from User State Graphs is shown in FIG. 9. As noted above, the Agent has the task of monitoring, curating, and mapping the User State Graphs to a Group State Graph continuously over time. The User Stage Graph may be restricted to relevant subgraphs and not all subgraph members. The objective with Group State Graph creation is not to lose any user information but also to map it into relevant subgraph information that can be acted on without referring to original user state graphs of group member users. Thus some computational inference and smart organization of the group state graph can be applied by the Agent to achieve this.

Referring to the illustration of User State Graph Mapping in FIG. 9, the Agent preserves information but at the same time can map and reduce the Group State Graph. For example, as shown there is no need to preserve User C's normal blood sugar level, only the outlier user subgraph for Users A and B where the blood sugar levels are abnormal thus affecting a suggestion from the Agent. The same approach is shown in the example for a behavioral subgraph. Generally the Agent maps the union (overlap) of the User State Graphs but not necessarily the intersection or difference, though that may be useful for some situations. In the example shown, the Agent will normally want to keep the fact that User C dislikes spicy meals but in this particular state, User C will not be eating so that might be inferred as redundant information for this Group State Graph time slice, but would still be relevant to a later time slice.

As the User State Graphs are updated, so is the Group State Graph which is made up of time slices of mapped User State Graphs.

As an example of the Agent now utilizing the Conversation Graph which results from the conversation in FIG. 8 and as described below to generate a suggestion, User A asks User B and User C if they have any plans and would like to get together in the early evening for a while. The Agent can infer that because User C is not eating, a more casual dinning selection might be more relevant as a more formal dinner would make User C feel uncomfortable. The Agent can infer that because User B is not attending but also has friends at the hockey game, perhaps the Agent should see if there are any tickets available for User B if they have no other plans that evening.

Chat Entities and Conversation Subgraphs

Figure 10:
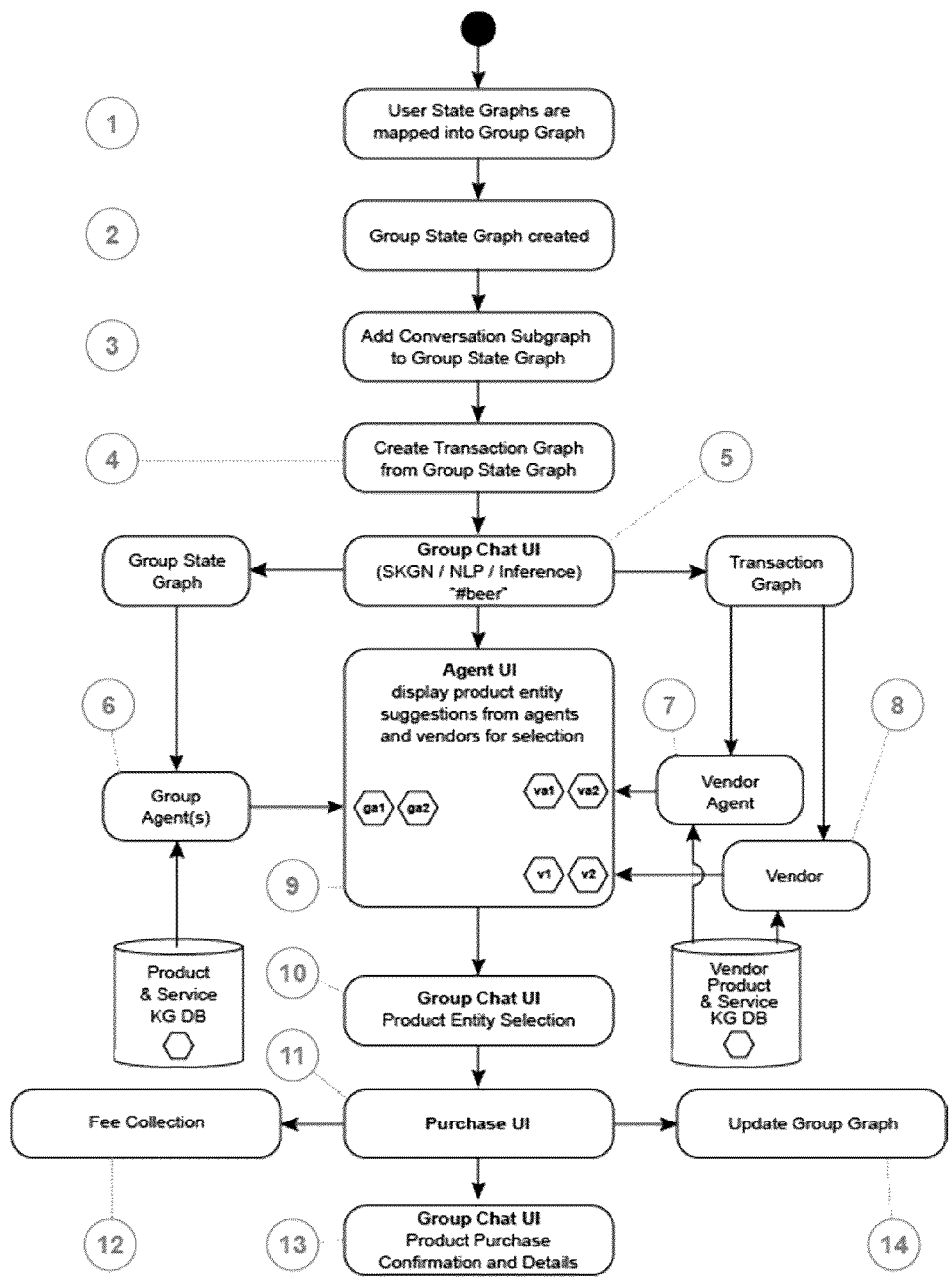
FIG. 10 is a schematic diagram illustrating creation and curation of the Group Graph.
Figure 11:
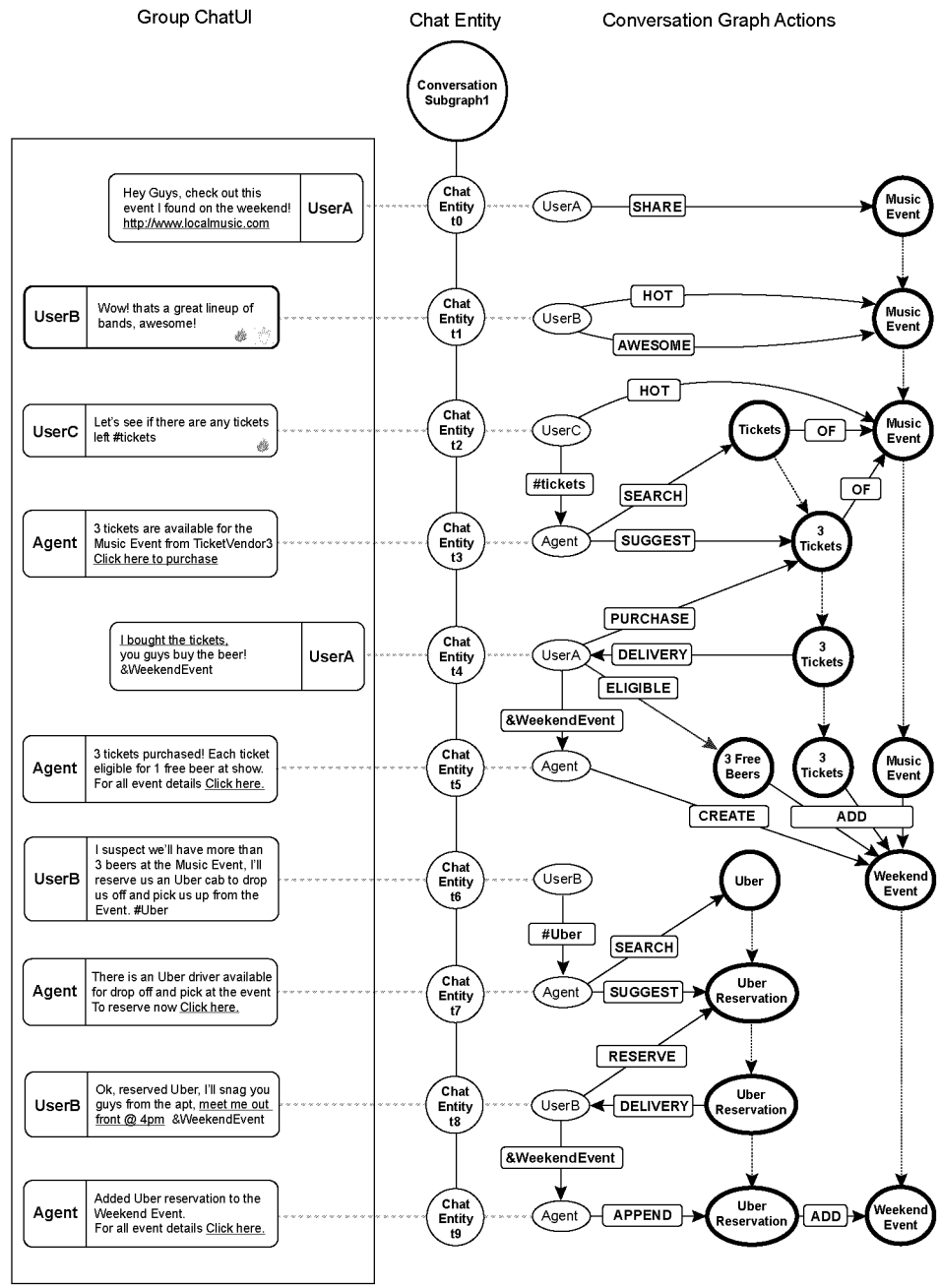
FIG. 11 is a schematic diagram illustrating a Conversation Subgraph and Agent Actions.

In step (3) of FIG. 10, the Conversation Subgraph the building of which is shown in FIG. 11, is added to the Group State Graph. The Conversation Subgraph is the Agent's notes obtained from the group conversation to date. It is obtained by the Agent through the users' use of a graph notation in the chat messages (for example a Simple Knowledge Graph Notation or SKGN) and the Agent's analysis of it. The Conversation Graph may or may not be maintained after a group 'closes'. This may depend on whether or not group is ad hoc or is named/saved. A Conversation Graph for a chat session is constantly developing and added to as the conversation threads and branches. SKGN (or direct Agent involvement) sets a current focus state of the Conversation Graph so that incoming agent or vendor suggestions can be added to the conversation graph at the focus topics. "Focus topics are shown as bold circle/ovals in FIG. 11.

FIG. 11 illustrates the Conversation Subgraph & Agent Action Initiation. At the initiation of every chat, the Agent adds (if not already present, i.e. saved) a subgraph to the GSG called the Conversation Subgraph. The Conversation Subgraph is a mutual shared graph between all of the users and agents in the chat. Like any social network conversation, there is typically a starting topic, that participants comment on and over the course of time, the comments and conversation tend to branch into new topics related or relevant to the first topic. This bifurcation process is a natural part of human communication and is seen in most social network comments and instant messaging chats.

Every Group Graph can have one or more conversation subgraphs representing different chats or conversations belonging to that group. At the beginning of every chat session, the agent chooses a pre-existing conversation subgraph or creates a new one for that Group Graph. Different conversation subgraphs can be accessible by some or all of the group members. Every Conversation Subgraph is composed of discrete chat entities, each of which represents a new entry into the Conversation Subgraph. A chat entity is a member of the graph database and can have other entities and properties associated with it.

The chat entities are related to each other via a time sequence, as would be found in a normal chat sequence of entries. Different conversation subgraphs may be organized around users or topics and may not use a temporal sequence per se. All conversation subgraphs capture context in the way their chat entities are created and organized whether sequentially or topic-wise.

Thus a given chat group may have multiple Conversation Subgraphs, with each Conversation Subgraph directed to a particular area/topic. The Agent can provide specialized application with customized user interfaces which are focused/trained on particular topics e.g. hockey, gardening etc.

Like any social network conversation, there is typically a starting topic, that then participants comment on and over the course of time, the comments and conversation tend to branch into different topics related or relevant to the first topic. This bifurcation process is a natural part of human communication.

The User can invoke the Agent to perform different tasks from searching for things or doing other actions based on the User's request. These are typically invoked by the use of SKGN, as shown in FIG. 11, by using the "#" and "&" operators in conjunction with a keyword.

In the example shown in FIG. 11, User C initiates an Agent search for tickets via "#tickets" to the event shared by User A. The Agent searches for tickets and then suggests ticket purchase options to User C to decide which to share with the rest of the group. In this case User A decides that purchasing the tickets from TicketVendor3 is a good idea, they click the link presented in the Agent suggestion tile (shown as box "SUGGEST") and are taken to TicketVendor3's website to complete the transaction for the ticket purchase. This may be by way of an Agent Tile Buy (Action) button which invokes the agent to open a window/tab to a vendor purchase screen (such as a 'click here to purchase' link below).

The Ticket purchase details are sent to User A's email and that ticket information link can be shared with the rest of the group as shown below. In addition to sharing the ticket information link, User A decides it would be a good idea to create a container (i.e. folder or bundle etc.) to attach the ticket info link to it as there will probably be more information that needs to be organized for the event such as maps, photos of the event etc. By using the "&WeekendEvent" SKGN, the Agent creates a container (if one doesn't exist) called "WeekendEvent" and adds the Music Event Link, ticket purchase info link to it, including additional links for the redemption of three free beers at the event that were part of the ticket info web page. Note any of the other Users in the group chat can now add things to the group container.

Later in the chat, User B decides to search for an Uber cab to convey the group to and from the Music Event. Again this is done using the SKGN #Uber hashtag and the append tag, "&WeekendEvent". At any point, any of the users can click the Agent presented 'WeekendEvent' link and see a display of all the information in the container.

The primary goal of the conversation graph is to create a real time mappedgraph of the conversation so that the users and agents have a 'scaffold' to make decisions with. The conversation graph 'grows' with a the addition of focus topics (shown in bold) that are added to the conversation graph from the chat entities, typically in context to previous focus topics as shown in FIG. 11. Users can 'vote' on Agent suggestion tiles with semantic context such as literal vote, like, dislike, agree etc. These contexts are also recorded in the conversation graph as edge information between the focus topics and may allow the Agent to perform actions or add more focus topics to the conversation graph. Every incoming chat entity message can be analyzed by NLP, Inference or other method and the result can be a probabilistic addition of more focus topics to the growing conversation graph.

By using SKGN, users can also directly grow the conversation graph, in this case one topic node at a time via usage of "#" As users react to each chat message or item introduced, they can add context to it and the agents can begin to infer possible actions to take or refine introduced suggestions. As Users ask agents to perform actions (such as search, buy, book, reserve, sell etc.), this creates an 'n-branch decision path' which is a subset of the conversation graph where decisions that lead to actions were made. In FIG. 9, these are represented by the heavier outlined objects and dotted lines.

These decision paths are valuable in that they represent a 'learned' group behavior set completely in context and relevance to that user group. These may be stored in the Group's Behavior graph (so the next time the group wants to drink beer, the Agent has 3 previous choices to offer them) and also used in aggregate so that similar groups with similar context might also find them useful and actionable.

With reference back to FIG. 10, step (4), Transaction Graph, the Agent builds and maintains the Transaction Graph from the Group State Graph. The Transaction Graph acts as an anonymized, simplified version of the GSG that contains essential details about the group and the groups desires. Most subgraphs may be removed and the GSG conversation subgraph may be normalized into strictly relevant purchase queries for Vendors and/or Vendor Agents to consume for Product/Service Entity suggestions.
ConversationTopics & Simple Knowledge Graph Notation (SKGN); Agent Conversation Knowledge Collection & Context/Relevance Looking at step (5) in FIG. 10, Group Chat User Interface—Focus Topics, this is the Primary interface for chat participants. It uses, for example the Simple Knowledge Graph Notation (SKGN) as described above to directly invoke the Agent. For example the users use the symbol "#" to designate a main topic of a chat and other symbols such as ">" and "." may be used to designate additional context for the main topic. The Agent may also self-invoke contextual data from the Users via Natural Language Processing or Inference derived queues as well, based on the Conversation Graph. The Agent curates the Conversation Graph as the group chat progresses and in turn also updates the GSG and Transaction Graphs. Users can set active focus topic nodes on the conversation graph by using the SKGN, and by returned suggestions from the Agent which get 'attached' to the conversation. The group chat can have more than one focus topic but even then may be in some relevant context (e.g. taxi, dinner & movie).
Agent Semantic Analysis & Product/Service Matching; Agent Product/Service Selection from Context/Relevance; Agent Selection Tile Formatting and Presentation; User Selection Tile In-Chat Presentation Looking at step (6) in FIG. 10, Group Agents. On invoke, the Agent analyses the GSG and draws Product/Service Entity suggestions from Product and Service Knowledge Graph database (using for example the Google Knowledge Graph). These are displayed as 'suggestion tiles' in the Agent User Interface for the user to choose from. Once one or more tiles are selected, they are displayed in the Group Chat User Interface for the other chat members to consider. The User may also directly invoke a purchase/reservation directly from the Agent User Interface without informing other chat members.

(7) & (8) Vendor & Vendor Agents. The Transaction Graph may also be made available to Vendors who have registered with the system and their Vendor Agents 24. A Vendor who is interested in soliciting a group through their Transaction Graph can do that themselves (8) or through a more automated fashion via their own agent 24. Vendor Agents can analyse the group's Transaction Graph and suggest products and services from the Vendor's database.

Group Selection Tile Interaction & Feedback; Group Selection Tile Execution & Conversion (Call to Action); Call to Action Tile in-Chat Presentation Step (9) in FIG. 10 illustrates the Agent User Interface—Suggestion Tile Display described above. The Agent User Interface displays all the suggestions for the current conversation state from the group's agent(s) or the Vendor and/or their agents. The User selects a suggestion and this gets added to the Conversation Graph focus node. Unselected suggestions can also be added to the focus node in different contexts. A User can also directly engage a transaction with the suggested product or service without Group participation. A User can save any or all members of the suggestion set for future recall and/or engagement.

(10) Group Chat UI—Product Entity Selection. The User selections in step 9 are displayed in the Group Chat User Interface. Other group members can then offer comment, vote or otherwise participate in the decision to purchase the suggested product of service.

(11) Purchase User Interface. The Purchase UI provides a transaction function by way of a payment system. Purchase UI may be hosted and operated by a selected product vendor such as Paypal or may be handed off to vendor site and the transaction completed outside of the Agent server 22. Purchase is added to conversation graph as a purchased entity.

(12) Fee Collection. A portion of the purchase transaction is credited to the Agent as representing the system operator.

(13) Group Chat UI—Product Purchase Update. A Purchase Details (i.e. bundle) Tile is displayed in the Group Chat UI. The Purchase Tile is saveable/storable/retrievable by all group members. The Purchase Tile can include a receipt, map, scannable barcode, and the like.

(14) Update Group Graph and GSG. At step 14 the Group Graph, GSG, Conversation and all other relevant graphs are updated.

While those chat group members who are pseudo-users will not have a password to the system and may not have full access to features in the system such as the ability to independently utilize the Agent outside of the chat group, the Agent will have has generated a User Graph for each pseudo-user referenced to the pseudo-user's email, Facebook, Twitter, Linked-In, Xbox etc. account through which the user was invited into the chat group. One individual therefore may have multiple pseudo-user accounts which eventually can become merged. The Agent will build up the pseudo-user's User Graph with whatever data is available. Eventually the pseudo-user may register as a regular user, either after participating in additional group chats, or when attempting to use the Agent through user interfaces which may be provided at various intervals to encourage the pseudo-user to register and log in. There will further be an incentive for the pseudo-user to register with the system given that the pseudo-user will likely experience some of the benefits that come with the knowledge acquisition which has been carried out by the Agent.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true scope.

What is claimed is:

1. A computer-implemented method of using the Internet to connect merchants with potential purchasers in chat groups who wish to obtain suitable sources of goods and services, wherein a plurality of chat group members each have a computer device comprising mobile devices, tablets, smart devices, laptops or desktop computers for wirelessly accessing a computer network and provided with chat application software and software for accessing and interactively communicating via a computer network with a server provided with a search engine for searching the Internet, and wherein one or more members of said chat group is provided with application software on said computer device for a software agent to maintain knowledge graphs in the form of a User Graph for one or more members of said chat group and a Group Graph combining two or more User Graphs, wherein each User Graph comprises a plurality of nodes, said method comprising:

a) said software agent generating one or more User Graphs for said one or more members of said chat group, each said User Graph comprising contextual data in relation to a specific one of said one or more members of said chat group, wherein the contextual data is stored in a plurality of said nodes of said User Graph and each of said nodes of said User Graph is related to at least one other of said nodes of said User Graph, and whereby said software agent tracks the state of the subject of each said User Graph by curating data to assist an understanding of said subject of said User Graph's past and current states and needs, combining two or more said User Graphs into said Group Graph by detecting similarities between said nodes of said User Graphs and implementing machine learning to combine said User Graphs into said Group Graph based at least in part on the detected similarities and using said Group Graph to predict possible future states and needs of said one or more members of said chat group, wherein said future states and needs comprise at least one of a product and a service;

b) periodically initiating a chat conversation among said plurality of chat group members wherein a search application for utilizing a search engine is invoked through said software agent, a search of the Internet for products or services is conducted during the course of said chat conversation and one or more products or services are ordered as a result of said Internet search;

c) said software agent implementing machine learning using said knowledge graphs by updating said one or more User Graphs and Group Graph to include data generated by said Internet search and resulting order of products or services;

d) providing said future states and needs to a vendor;

e) receiving a vendor suggestion from the vendor, wherein the vendor suggestion is based at least in part on said future states and needs and comprises at least one of a product and a service provided by the vendor; and f) said software agent utilizing said Group Graph to optimize the scope of searches by said chat group for products and services and displaying the vendor suggestion in said chat group.

2. The method of claim 1 wherein said software agent converts each User Graph into a plurality of User State Graphs to facilitate the analysis of the User Graphs using machine learning.

3. The method of claim 2 wherein said software agent combines a plurality of said User State Graphs into a Group State Graph to simultaneously curate an understanding of a plurality of chat group members' past and current states and predict possible future states of said plurality of chat group members by implementing machine learning using said knowledge graphs.

4. The method of claim 1 wherein a unique form of notation is used for communication between each said chat group member and said software agent.

5. The method of claim 4 wherein said unique form of notation is a Simple Knowledge Graph Notation.

6. The method of claim 1 wherein said software agent generates a User Graph for users who join said chat group from time to time without registering for the software agent's service, whereby said software agent can improve its ability to predict the needs and choices of the chat group by implementing machine learning using said knowledge graphs.

7. The method of claim 3 wherein said software agent generates a Conversation Subgraph added to the Group State Graph to simultaneously curate an understanding of a plurality of chat group members' past and current states and predict possible future states of said plurality of chat group members by implementing machine learning using said knowledge graphs.

8. The method of claim 1 wherein detecting similarities between said nodes of said User Graphs comprises determining a union of said User Graphs.

9. The method of claim 1 wherein detecting similarities between said nodes of said User Graphs comprises determining a statistical relevance of one of said nodes within one of said User Graphs.

* * * * *